United States Patent [19]

Manzke et al.

[11] 4,216,510
[45] Aug. 5, 1980

[54] DRIVE APPARATUS FOR MAGNETIC DISCS

[75] Inventors: Klaus Manzke, Westheim; Roland Brotzler, Hochdorf-Assenheim; Gerhard Berg, Sandhausen; Karl Uhl, Frankenthal, all of Fed. Rep. of Germany

[73] Assignee: BASF Aktiengesellschaft, Ludwigshafen, Fed. Rep. of Germany

[21] Appl. No.: 895,457

[22] Filed: Apr. 11, 1978

[30] Foreign Application Priority Data

Apr. 16, 1977 [DE] Fed. Rep. of Germany ....... 2716848

[51] Int. Cl.² .............................................. G11B 17/02
[52] U.S. Cl. ..................................... 360/99; 360/133; 360/97
[58] Field of Search ...................... 360/99, 98, 97, 133

[56] References Cited

U.S. PATENT DOCUMENTS

| | | | |
|---|---|---|---|
| 3,890,643 | 6/1975 | Dalziel | 360/99 |
| 3,891,796 | 6/1975 | Takahara | 360/99 |
| 3,898,814 | 8/1975 | Chou | 360/99 |
| 3,940,793 | 2/1976 | Bleiman | 360/99 |
| 4,024,581 | 5/1977 | Lesca | 360/99 |
| 4,040,106 | 8/1977 | Medley | 360/99 |

FOREIGN PATENT DOCUMENTS 2330358 1/1974 Fed. Rep. of Germany ............. 360/99
2609926 9/1976 Fed. Rep. of Germany ............. 360/99

OTHER PUBLICATIONS

IBM Technical Discl. Bulletin, p. 291, vol. 22, No. 1 Jun. 1978-Loading Collett for Flexible Mag. Disk, Holecek et al.

Primary Examiner—John H. Wolff
Attorney, Agent, or Firm—Keil & Witherspoon

[57] ABSTRACT

A drive apparatus for a magnetic disc, particularly a flexible magnetic disc in an envelope, distinguished by a compact design which is achieved by so designing and arranging the linkage between the drive's closure member and disc clamping member that they take up as little room as possible. By designing the linkage in the form of a roller and lever arrangement and arranging them substantially on the central longitudinal axis of the housing of the drive apparatus in the upper portion of the housing, the maximum amount of space is available on either side of the linking means for printed circuit boards and electronic components. In a very advantageous embodiment, the closure member, linkage and clamping member and part of the housing are assembled as a single unit which is ready for fitting.

The drive apparatus of the invention can be used for any kind of flexible or rigid magnetic disc.

11 Claims, 5 Drawing Figures

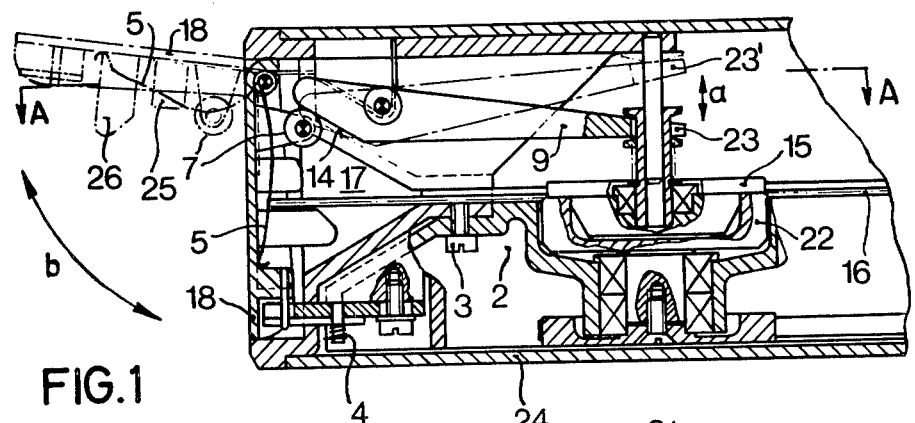
FIG.1
FIG.1a
FIG.2
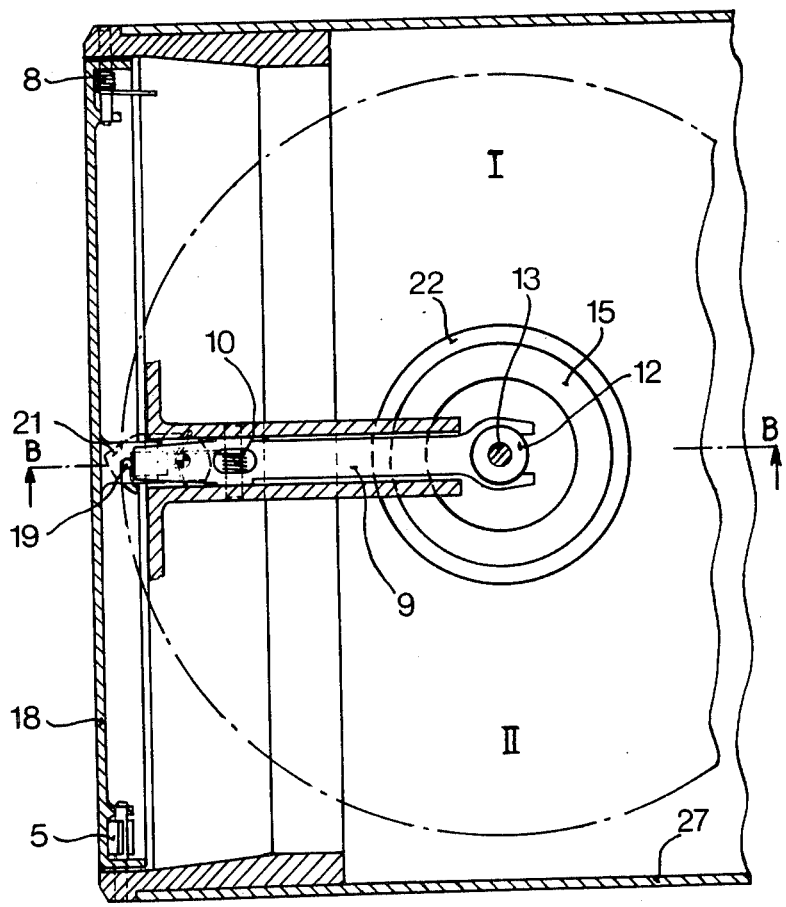

DRIVE APPARATUS FOR MAGNETIC DISCS

The present invention relates to a drive apparatus for a magnetic disc, particularly a flexible magnetic disc in an envelope, comprising means for receiving and driving the recording medium, the receiving means comprising a housing having a pivotable closure member and locking means for said closure member, and the driving means consisting essentially of a rotatable clamping member and a driven recessed member that cooperates with said clamping member, which clamping member and recessed member can be caused to engage one another, after the recording medium has been introduced therebetween, for rotation of the recording medium, linking means being provided between the closure member and the clamping member, which linking means are actuated when the closure member is closed or opened.

Drive aparatus for flexible magnetic discs, also called floppy discs, have already been disclosed, for example in U.S. Pat. No. 3,940,793 in which the clamping member is connected to an arm and caused to engage the flexible magnetic disc and a hub member when the arm is pivoted. In the case of such a disc drive, space utilization is poor because of the way in which the arm is mounted for pivotal movement about an axis which extends across the housing, and damage to the magnetic disc during the clamping and centering operation cannot be ruled out, particularly when loading and unloading is carried out frequently.

In another prior art disc drive the clamping member is displaced vertically relative to the operating position of the recording medium when the door in the housing is opened or closed. Before the door can be opened or closed, locking means must be additionally actuated, which makes operation complicated. Moreover, the means connecting the clamping member to the door occupy substantially all of the space inside the housing, so that there is no room in the upper portion of the housing for other parts of the disc drive.

German Laid-Open Application No. DOS 23 30 358 discloses another flexible disc drive in which the whole disc cartridge holder, after introduction of a disc cartridge, can be pivoted, by actuating a door, relative to a fixed drive member. The door carries a roller as actuating element, by means of which the disc cartridge holder is moved to the cartridge loading position when the door is swung open. As the door is pivoted to its closed position, the roller being disengaged from the said holder, it completely presses home any disc cartridge which may not have been fully inserted, and hence positions the disc with respect to the fixed drive member. Such a design is expensive and complicated because of the large number of individual parts. A further disadvantage is that the operating position of the disc is mainly determined by a spring arranged between the disc cartridge holder and the housing. Locking/unlocking means for the door are not envisaged.

It is an object of the present invention to improve prior art disc drive apparatus. It is a further object of the invention to simplify operation while keeping production costs and the space requirements of the drive apparatus to a minimum.

These objects are achieved according to the present invention with a drive apparatus for a magnetic disc, particularly a flexible magnetic disc in an envelope, comprising means for receiving and driving the recording medium, the receiving means comprising a housing having a closure member and locking means for said closure member, and the driving means consisting essentially of a rotatable clamping member and a driven recessed member that cooperates with said clamping member, which clamping member and recessed member can be caused to engage one another, after the recording medium has been introduced therebetween, for rotation of the recording medium, linking means being provided between the closure member and the clamping member, which linking means are operated when the closure member is actuated, wherein the linking means comprise a roller arrangement and a lever arrangement which are attached to the closure member and clamping member respectively and are arranged substantially on the central longitudinal axis of the housing; a guide shaft is provided for the clamping member which permits the latter to move vertically with respect to the operating plane of the recording medium; and the locking means are designed and arranged in such a way that, when the closure member is closed and opened by hand, it is automatically locked and unlocked.

As a result, the recording medium can be introduced into the drive apparatus and the clamping member into the central aperture in the recording medium without the latter being damaged, and unintentional opening of the closure member is avoided and consequently the entry of dust into the housing is kept to a minimum. A particular advantage of the new design is that the overall height of the drive apparatus is appreciably reduced and at the same time the usable space inside the housing is increased.

In an advantageous embodiment of the drive apparatus of the invention the lever arrangement consists of one pivotally mounted fork-shaped lever which is provided with an inclined surface that cooperates with a roller on the closure member.

As a result, only a small space is required for the lever arrangement and the lever is relatively simple to manufacture.

In a further embodiment of the drive apparatus according to the present invention, the locking means on the closure member and the housing consist of a pin and a pivotally mounted catch. These parts can be manufactured and fitted very economically and at the same time are very reliable in operation and have a long life.

In another embodiment of the drive apparatus of the invention, at least one leaf spring which acts as insertion aid for the recording medium is provided on the inner surface of the closure member.

Proper and reliable positioning of the recording medium is thus achieved even if it has not been fully inserted in the drive apparatus.

In yet another embodiment of the invention, at least one printed circuit board together with electronic components is provided at the side of the lever arrangement in the upper portion of the housing.

In a further advantageous embodiment of the drive apparatus of the invention, the closure member, linking means and clamping member are in the form of a pre-assembled unit. This enables the drive apparatus to be mass-produced at low cost, and facilitates assembly with the unit incorporating the recessed member.

To summarize, then, the present invention resides essentially in the fact that (a) engagement of the clamping member and the recessed member and hence clamping of the recording medium therebetween and (b) disengagement of the clamping member from the recessed member and hence release of the recording medium can be effected simply by manually closing and opening the closure member respectively, the closure member being in the form of a flap which is so designed that a substantially dust-tight seal is obtained.

In addition, the drive apparatus according to the present invention has the following advantages:-

Operation is extremely simple due to the fact that only the closure member has to be actuated, which is done by hand. The overall height of the drive apparatus is low due to the fact that the clamping member moves vertically and the linking means take up very little room, which enables the electronics for the apparatus to be arranged in the upper portion of the housing;

centering and clamping of the recording medium can be effected without damaging it owing to the fact that the clamping member enters the central aperture vertically;' insertion and withdrawal of the recording medium is facilitated in particular by the large entrance slot extending over the entire width of the housing;

the entrance slot is completely covered by a closure member whose outer surface has no projecting parts; and premature starting of the drive as a result of forced insertion of the recording medium is avoided.

Further details of the invention are disclosed in the following description of one embodiment of the drive apparatus illustrated in the accompanying drawings, in which FIG. 1 is a diagrammatic cross-sectional view of the front portion of a flexible magnetic disc drive apparatus according to the present invention, taken along the median longitudinal plane;

FIG. 1a shows the locking means of the disc drive apparatus of FIG. 1;

FIG. 2 is a diagrammatic plan view taken along the plane A—A of FIG. 1, showing the flexible magnetic disc in part;

Figure 3:
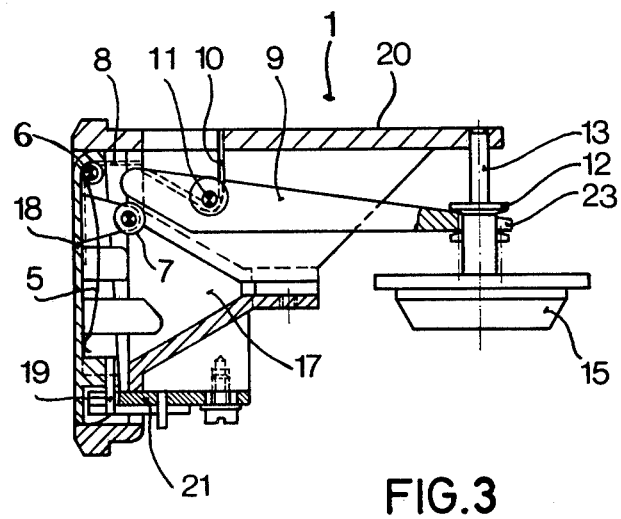
FIG. 3 is a diagrammatic cross-sectional view of the closure member, clamping member and linking means, shown in FIG. 1, assembled as a single unit.

The housing 20 of a drive apparatus for a flexible magnetic disc 16 in a stiffer rectangular envelope is closed at the front with a flap 18. This flap 18 is mounted for pivotal movement about axis 6 in the directions indicated by double arrow b and is biassed in the opening direction by means of spring 8. Locking means for flap 18 consist of a pin 19 attached thereto and a catch 21, as shown in FIG. 1a. Catch 21 is pivotally mounted and is held in position parallel to the bottom 24 of the housing 20 by means of a spring 4. Manual pressure on flap 18 causes the pin 19 and catch 21 to engage or disengage, thus locking or releasing the flap. The open position of flap 18 is shown in dashed lines in FIG. 1. Behind flap 18 there is arranged an entrance slot 17 for the disc cartridge, the V-shaped guide surfaces of which preferably extend over the entire width of the housing 20. The drive apparatus also comprises a rotatably mounted clamping member 15 which has the shape of a truncated cone and serves to center and clamp the magnetic disc 16. The clamping member 15 cooperates with a recessed hub 22 which can be rotated by a drive motor (not shown) and whose housing is fastened to the bottom 24 of the housing 20. Between flap 18 and clamping member 15 there are arranged linking means consisting of a lever 9 which is mounted for pivotal movement about axis 11 against the action of spring 10, and of a roller 7 which is arranged on the inner surface of flap 18 and cooperates with an inclined surface 14 on lever 9. At the end of lever 9 there is arranged a guide sleeve 12 about which the clamping member is rotatable. Sleeve 12 can be displaced on guide shaft 13, which is fastened at right angles to the top of housing 20, by pivoting lever 9. The operating position of clamping member 15 is shown by position 23 of lever 9 (solid line in FIGS. 1 and 3), and its unclamped position by position 23' of the lever (dashed line in FIG. 1). In the unclamped position 23' flap 18 is open, as shown in dashed lines in FIG. 1, roller 7 being disengaged from the inclined surface 14 of lever 9 which is urged into its inclined position 23' by spring 10. In this position the clamping member 15 is at a pedetermined distance from the recessed hub 22, so that the cartridge with magnetic disc 16 can pass therebetween for insertion and withdrawal.

As flap 18 is closed, roller 7 is urged against the inclined surface 14 of lever 9 which, owing to the position of pivot axis 11, is caused to move to position 23. As a result, sleeve 12 and clamping member 15 attached thereto are moved downwardly to the operating position. In this position magnetic disc 16 is centered and clamped between clamping member 15 and recessed hub 22 and can be rotated together with the clamping member 15 when the recessed hub 22 is driven.

As is shown in FIG. 2, the tip of lever 9 is fork-shaped, the fork embracing the sleeve 12. There is provided on the inner surface of flap 18 a leaf spring 5 which is bowed inwardly toward the center of the housing and gently urges a disc cartridge which may not have been fully inserted, into the correct operating position. Leaf spring 5 serving as cartridge insertion aid is arranged only at the side of the housing in the immediate vicinity of side wall 27. Projections 25 and 26 on the inner surface of flap 18 serve to limit vertical movement of the trailing edge of the disc cartridge.

Figure 4:
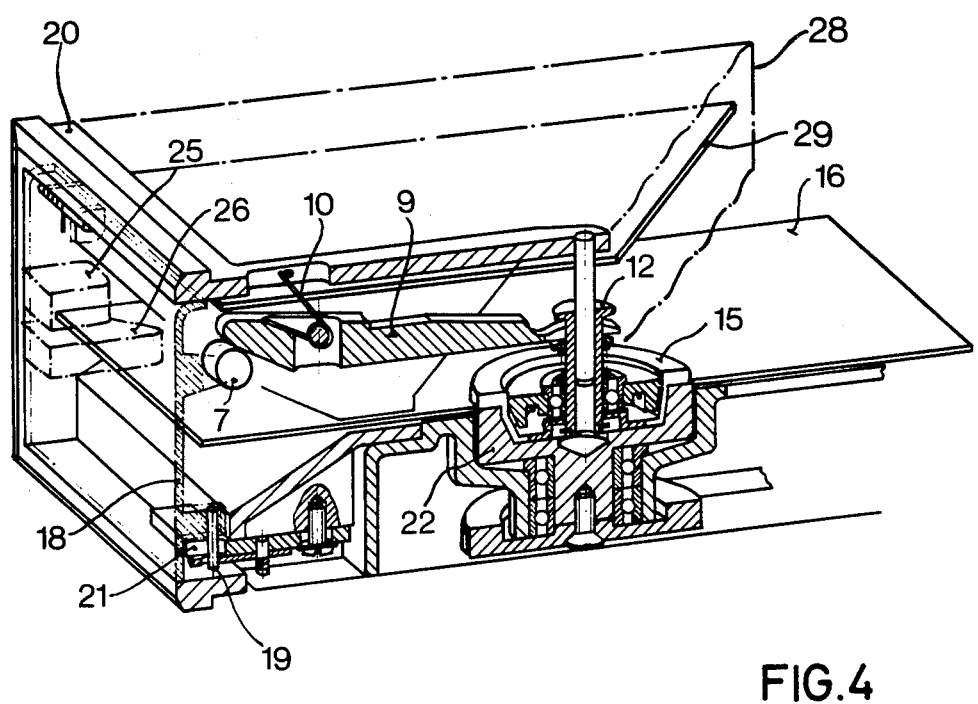
FIG. 4 is a diagrammatic partial perspective view taken along the plane B—B of FIG. 2.

As disclosed above, pressing the closed flap 18 inwards toward the interior of the housing disengages the locking means 19 and 21, thus allowing the flap to open, and depression of the open flap causes the said locking means to engage one another, thus locking the flap. The clamping member 15 is raised and lowered by the roller 7 and lever 9 when the flap is opened and closed, without there being any need to perform any further manual operations. By positioning the roller 7 and lever 9 substantially on the central longitudinal axis of the housing, which corresponds to line B—B of FIG. 2, it is possible to obtain a particularly compact design. There is room for printed circuit boards and electronic components on either side of lever 9 in regions I and II (cf. FIG. 2). The space that is available in region I is shown in dot-dash lines in FIG. 4 (block 28), reference numeral 29 designating a printed circuit board.

FIG. 3 shows flap 18, clamping member 15 and the linking means (roller 7 and lever 9) assembled as a single unit which can be advantageously fitted as such in the drive apparatus, and fastened to unit 2, comprising recessed hub 22, with a screw 3. As can be seen from this Figure, such an assembly includes part of the housing 20 as support for guide shaft 13. Although in the present embodiment the slot is provided with V-shaped guide surfaces and the door with a spring as cartridge insertion aid, the said guide surfaces and spring may be dispensed with.

We claim:

1. In a drive apparatus for flexible magnetic discs each carried in a flat rectangular cartridge having a central opening through which a central annular portion of the disc is driven in operation, said apparatus comprising means for receiving and driving said disc, said driving means including a rotatable clamping member and a driven recessed member cooperating with said clamping member, and said receiving means including a housing means having a closure member hinged about an axis perpendicular to that of said driven member and providing access to a horizontally extending disc cartridge insertion slot, there being provided linking means between said closure member and said clamping member for causing said disc to be clamped between said clamping member and said driven member, and be driven thereby, when said closure member, upon insertion of said disc carrying cartridge into said entrance slot, is closed, and to be unclamped when said closure member is opened, the improvement,
that there is secured to said housing means a relatively stationary guide shaft extending coaxially with said drive member, said clamping member being carried by said guide shaft for straight axial sliding movement therealong, under the control of said linking means, vertically towards and away from the operating plane of said disc, and
that said closure member is provided with locking means for automatically locking and unlocking said closure member incident to said closure member being manually closed and opened, respectively.

2. In a drive apparatus the improvement as claimed in claim 1, wherein said linking means includes a centrally pivoted two-armed lever, one end of said lever being connected to said slidable clamping member and the other end being provided with an inclined surface cooperating, when the closure member is closed, with a roller on the last-mentioned member, said lever being spring biased in the unclamping direction.

3. In a drive apparatus the improvement as claimed in claim 2, wherein said lever is disposed, in the space of said housing means above said insertion slot, substantially in the vertical plane extending, longitudinally of said housing means, through the axis of said guide shaft, and has a width small compared with that of said housing means, and wherein at least one printed circuit board together with electronic components is provided, laterally of said lever, in said space of the housing means above the insertion slot.

4. In a drive apparatus the improvement as claimed in claim 2, wherein the upper part of the housing means, the closure member with said roller thereon, the insertion slot and the clamping member together with the guide sleeve, guide shaft and lever are in the form of a separate assembly, means being provided for securing said assembly to the remainder of said housing means.

5. In a drive apparatus the improvement as claimed in claim 1, wherein said clamping member is provided with, and mounted for rotation about, a guide sleeve slidably mounted on said guide shaft, said guide sleeve being embraced by said one end of the lever, said one end being fork shaped, so that said clamping member is displaced by said lever, together with said guide sleeve, on said guide shaft.

6. In a drive apparatus the improvement as claimed in claim 1, wherein said locking means includes a pin mounted on said closure member and a catch pivotally mounted on said housing means so that manual depression of the closure member inwardly toward the interior of said housing means causes said pin and said catch to be disengaged from each other, allowing the closure member to open.

7. In a drive apparatus the improvement as claimed in claim 1, wherein at least one spring is provided on the inner surface of the closure member so as to act as an insertion aid for said disc.

8. In a drive apparatus for flexible magnetic discs each carried in a flat rectangular cartridge having a central opening through which a central annular portion of the disc is driven in operation, said apparatus comprising means for receiving and driving said disc, said driving means including a rotatable clamping member and a driven recessed member cooperating with said clamping member, and said receiving means including a housing means having a closure member hinged about an axis perpendicular to that of said driven member and providing access to a horizontally extending disc cartridge insertion slot, there being provided linking means between said closure member and said clamping member for causing said disc to be clamped between said clamping member and said driven member, and be driven thereby, when said closure member, upon insertion of said disc carrying cartridge into said entrance slot, is closed, and to be unclamped when said closure member is opened, the improvement,
that said linking means includes a roller on said closure member and a centrally pivoted two-armed lever at one end connected to said clamping member and at the other end cooperating with said roller, and
that a guide shaft is fastened to the upper part of said housing means so as to extend coaxially with said driven means, said clamping member being arranged for straight axial displacement along said guide shaft so that, when the closure member is opened, the clamping member is automatically moved by the lever, over a path at all times normal to the operating plane of said disc, to the unclamped position at the fastened end of the guide shaft and, when the closure member is closed, the clamping member is automatically moved by the lever, over said normal path, to the clamped position at the free end of the guide shaft.

9. In a drive apparatus the improvement as claimed in claim 8, wherein said clamping member is provided with, and mounted for rotation about, a guide sleeve slidably mounted on said guide shaft, said guide sleeve being embraced by said one end of the lever, said one end being fork shaped, so that said clamping member is displaced by said lever, together with said guide sleeve, on said guide shaft.

10. In a drive apparatus the improvement as claimed in claim 8, wherein the upper part of the housing means, the closure member with said roller thereon, the insertion slot and the clamping member together with the guide sleeve, guide shaft and lever are in the form of a separate assembly, means being provided for securing said assembly to the remainder of said housing means.

11. In a drive apparatus the improvement as claimed in claim 8, wherein said lever is disposed, in the space of said housing means above said insertion slot, substantially in the vertical plane extending, longitudinally of said housing means, through the axis of said guide shaft, and has a width small compared with that of said housing means, and wherein at least one printed circuit board together with electronic components is provided, laterally of said lever, in said space of the housing means above the insertion slot.

* * * * *